Patented Nov. 10, 1931

1,830,980

UNITED STATES PATENT OFFICE

KENNETH W. CARR, OF CHICAGO, ILLINOIS, ASSIGNOR TO DITTO, INCORPORATED, OF CHICAGO, ILLINOIS, A CORPORATION OF WEST VIRGINIA

STENCIL SHEET

No Drawing.  Application filed December 14, 1928. Serial No. 326,146.

This invention relates to stencil sheets and more particularly to stencil sheets comprising a base material of loose, open texture such as for instance, yoshino paper, and a coating, the coating being of such a nature that it may be impressed and cut by the type of a typewriting machine or by a stylus or similar agency.

An object of this invention is to provide a stencil sheet which is cheap, durable and efficient and which may be used in its original dry condition, will not crack under ordinary usage, is substantially unaffected by ordinary heat changes, is impervious to ink as encountered in ordinary usage, is strong, and is one, the cut letters of which will last for imprinting a relatively large number of copies.

The principle involved in the formation of stencil sheets contemplated in this invention is that of providing a base material such as, for instance, a paper having relative long, loosely associated fibres, preferably yoshino paper, and treating such base material with a coating having as near as possible, three characteristic properties, which properties are; first, resistance to deterioration by inks such as will be encountered in ordinary usage; secondly, flexibility such as will maintain the coated paper flexible in character; and, thirdly, capability of being displaced by contacting type or a stylus to produce lines or characters or letters in the manner spoken of in the art as cutting a stencil.

In preparing a coating for the stencil sheet, the selection of a main ingredient, which inherently possesses as many of the above stated properties as possible, is desirable. According to the particular properties possessed by the main ingredient, various modifying agents may be incorporated therewith so as to produce a final coating material possessing as near as possible, the desirable properties above enumerated.

The present invention contemplates the use of a synthetic or artificial resin, known in the art as vinyl resins, which are understood to be products produced by the polymerization of vinyl compounds. Known resins in this group are vinyl acetate, ($CH_2CHC_2H_3O_2$) vinyl chloride, ($CH_2CHce$) vinyl bromide, ($CH_2CHBr$) and resinous products produced from some vinyl derivatives such as styrene, for instance. These various resins are produced by exposing the particular vinyl compound to ultra violet light and in some instances, as in the case of vinyl acetate, to either the ultra violet light or heat.

Depending upon the particular vinyl compound selected, that is, for instance, whether the resin is formed from vinyl acetate or vinyl chloride, the properties thereof are found to vary somewhat, particularly as to the hardness and elasticity of the resin produced and in some instances, mixtures of the various vinyl compounds may be made, whereby the properties of the resultant resin can be altered and determined by the blending of those producing a relatively hard and non-elastic product and those producing a softer and more elastic product in the proper proportions.

It is also known that the various vinyl compounds may be incorporated with certain modifying agents before they are polymerized, thereby producing a slightly modified resinous product in accordance with the modifying agents incorporated therewith. It will readily appear to anyone skilled in this art and with a knowledge of properties desired to be secured in the material to be used, as an ingredient in the stencil sheet coating, that various of these substances may be selected. But it has been found in practice that the resin produced by the polymerization of vinyl acetate serves well.

For the purpose of illustrating this invention, and to set forth one desirable method by which it may be practiced, a formula will hereafter be given in which vinyl acetate is selected as the main ingredient but the inclusion of this specific example is not to be considered as limiting the invention as the invention contemplates all of the vinyl resins referred to which possess those properties rendering them suitable for use as an ingredient in a stencil sheet coating.

In the particular illustration herein given by way of example, employing vinyl acetate as the main ingredient, it has been found desirable to incorporate with the resin, a modifying agent which acts to shorten the consistency of the resin. By shortening the resin is meant weakening the resin, destroying its tendency to exist as a unitary, solid, strong mass or in other words, rendering it dryer and more crumbly in character, such as is spoken of in the art as rotting down the resin.

In addition to the shortening agent, it is desirable to introduce softening agents for modifying the properties of the resin, such agents will tend to plasticize, lubricate or soften the resin and coating composition.

For use as a shortening agent, aluminum stearate is preferred, although other shortening agents such as pigments or fillers of which magnesium oxide, barytes are examples, may be employed with a high degree of success. It is also possible to shorten the mixture by the use of waxes or wax like substances such as paraffine or stearic acid respectively. Paraffine or similar waxes however, are not as desirable in this use as aluminum stearate or the pigments because the thermoplastic character of these substances makes for undesirable properties and further, they are found to retard the evaporation of certain solvents, such as toluol, which are desirable for use in producing the coating solution. Stearic acid, on the other hand, is found to serve well as a shortening agent, as it is not thermoplastic and does not retard evaporation of the solvents as above referred to.

The softening or plasticizing agents which are found to serve well in the particular example herein given are vegetable oils of the non-drying or semi-drying type, of which peanut oil. neat's foot oil and corn oil are examples, or mineral oils such as paraffin oil, which oils may be used alone or with a synthetic plasticizer, such as for instance, dibutyl phthalate or tricresyl phosphate.

In mixing the coating solution, it is necessary to provide a quantity of suitable solvent, the exact amount and nature of which will be selected to produce a solution of the desired viscosity. The preferred solvent comprises a mixture of toluol, alcohol and ethylene glycol monoethyl ether, it being found that these component solvents are completely miscible and that the toluol serves to dissolve the resin and the mixture of toluol and alcohol serves to dissolve the aluminum stearate and the ethylene glycol monoethyl ether serves to maintain a homogeneous solution of the various component substances.

Another solvent which may be employed comprises a mixture of ethylene dichloride and ethylene glycol monoethyl ether.

The proportions of the component solvents entering to make up the solvent for the coating mixture may be varied according to the nature of the coating desired, taking into account both the desired viscosity of the final coating compound and the nature of the mixture to be dissolved, the mixture varying with different proportions of the resin and the various modifying agents.

According to one preferred method of practicing the present invention, the coating material may comprise the following substances in the proportion specified.

10 parts by weight, of a 30 per cent solution of vinyl acetate in toluol.
2 parts aluminum stearate.
3½ parts peanut oil.
1 part dibutyl phthalate.

In compounding the coating mixture, the aluminum stearate, peanut oil and dibutyl phthalate are introduced and mixed in proper proportions in a container, and a solvent comprising a mixture of toluol, alcohol and ethylene glycol monoethyl ether is added in sufficient quantity to produce by the aid of heat, a comparatively thin solution. The proper amount of vinyl acetate resin solution which has been previously formed by dissolving 30 per cent of the resin in 70 per cent of toluol, is then added while the solution is still hot, after which the application of heat is continued until a homogeneous solution is produced suitable for application to the yoshino sheets. At this point, if necessary, the viscosity may be adjusted to bring the coating bath to the proper viscosity either by boiling off some of the solvent if the coating is too thin or by adding additional solvent if the coating is too thick.

The yoshino paper is then coated with the solution so formed by any suitable method but preferably by floating the paper on the top of the solution. If the solution is quite viscous, the excess of coating material may be removed from the sheets by drawing them over a straight edge or if the solution is of the proper consistency, the sheets need only be floated on top of the coating bath and then hung up to dry.

From the foregoing, it will be appreciated that the present invention provides a stencil sheet having the above mentioned desirable properties and one which may be cheaply and readily manufactured.

It is to be understood that the present disclosure is given merely by way of example and the invention is not to be limited thereby in any respect but is to be considered as covering all forms and modifications as will come within the scope of the appended claims.

I claim:—

1. A stencil sheet comprising a base sheet having a coating thereon comprising a vinyl resin and modifying agent.

2. A stencil sheet comprising a base sheet having a coating thereon comprising a vinyl resin and shortening agent.

3. A stencil sheet comprising a base sheet having a coating thereon comprising a vinyl resin and aluminum stearate.

4. A stencil sheet comprising a base sheet having a coating thereon comprising a vinyl resin and softening agent.

5. A stencil sheet comprising a base sheet having a coating thereon comprising a vinyl resin and one of a group of oils including non and semi-drying oils.

6. A stencil sheet comprising a base sheet having a coating thereon comprising a vinyl resin and one of a group of oils including non and semi-drying vegetable oils.

7. A stencil sheet comprising a base sheet having a coating thereon comprising a vinyl resin and dibutyl phthalate.

8. A stencil sheet comprising a base sheet having a coating thereon comprising a vinyl resin, shortening agent, and softening agent.

9. A stencil sheet comprising a base sheet having a coating thereon comprising a vinyl resin, shortening agent and one of a group of oils including non and semi-drying oils.

10. A stencil sheet comprising a base sheet having a coating thereon comprising a vinyl resin, shortening agent and peanut oil.

11. A stencil sheet comprising a base sheet having a coating thereon comprising a vinyl resin, shortening agent, softening agent, and dibutyl phthalate.

12. A stencil sheet comprising a base sheet having a coating thereon comprising a vinyl resin, shorting agent, one of a group of oils including vegetable non and semi-drying oils and other softening agent.

13. A stencil sheet comprising a base sheet having a coating thereon comprising a vinyl resin, shortening agent, one of a group of oils including vegetable non and semi-drying oils and dibutyl phthalate.

14. A stencil sheet comprising a base sheet having a coating thereon comprising a vinyl resin, shortening agent, peanut oil and dibutyl phthalate.

15. A stencil sheet comprising a base sheet having a coating thereon comprising a vinyl resin, aluminum stearate and softening agent.

16. A stencil sheet comprising a base sheet having a coating thereon comprising a vinyl resin, aluminum stearate and one of a group of oils including vegetable non and semi-drying oils.

17. A stencil sheet comprising a base sheet having a coating thereon comprising a vinyl resin, aluminum stearate and peanut oil.

18. A stencil sheet comprising a base sheet having a coating thereon comprising a vinyl resin, aluminum stearate, peanut oil and other softening agent.

19. A stencil sheet comprising a base sheet having a coating thereon comprising a vinyl resin, aluminum stearate, peanut oil and dibutyl phthalate.

20. A stencil sheet comprising a base sheet having a coating thereon comprising a vinyl resin, aluminum stearate, and dibutyl phthalate.

21. A stencil sheet having a coating thereon comprising a vinyl resin, one of a group of oils including non and semi-drying vegetable oils and other softening agent.

22. A stencil sheet having a coating thereon comprising a vinyl resin, peanut oil and other softening agent.

23. A stencil sheet having a coating thereon comprising a vinyl resin, peanut oil and dibutyl phthalate.

24. A stencil sheet coating comprising a solution of a vinyl resin, shortening agent and solvent therefor.

25. A stencil sheet coating comprising a solution of a vinyl resin, shortening agent, softening agent and solvent therefor.

26. A stencil sheet coating comprising a solution of a vinyl resin, a modifying agent and a solvent comprising toluol.

27. A stencil sheet coating comprising a solution of a vinyl resin, a modifying agent and a solvent comprising toluol alcohol.

28. A stencil sheet coating comprising a solution of a vinyl resin a modifying agent and a solvent comprising toluol alcohol and ethylene glycol monoethyl ether.

29. A stencil sheet coating comprising a solution of a vinyl resin a modifying agent and a solvent comprising ethylene glycol monoethyl ether.

30. A stencil sheet coating comprising a solution of a vinyl resin a modifying agent and a solvent comprising ethylene glycol monoethyl ether and other solvents.

31. A stencil sheet coating comprising a solution of vinyl resin, modifying agents and solvent therefor.

32. A stencil sheet coating comprising a solution of vinyl resin, shortening agents and solvent therefor.

33. A stencil sheet coating comprising a solution of vinyl resin, softening agents and solvent therefor.

34. A stencil sheet coating comprising a solution of vinyl resin, shortening agent, softening agent and solvent therefor.

35. A stencil sheet coating comprising a solution of vinyl resin, aluminum stearate, peanut oil, dibutyl phthalate and a solvent therefor.

36. A stencil sheet coating comprising a solution of vinyl resin, aluminum stearate, peanut oil, dibutyl phthalate and a solvent comprising toluol alcohol and ethylene glycol monoethyl ether.

37. A stencil sheet coating comprising a solution of the following substances in substantially the proportions specified: 10 parts by weight, of 30 per cent solution of vinyl acetate in toluol, 2 parts aluminum stearate, 3½ parts peanut oil, 1 part dibutyl phthalate.

38. A stencil sheet coating comprising a solution of the following substances in substantially the proportions specified: 10 parts by weight, of 30 per cent solution of vinyl acetate in toluol, 2 parts aluminum stearate, 3½ parts peanut oil, 1 part dibutyl phthalate, and a solvent comprising a mixture of toluol, alcohol and ethylene glycol monoethyl ether.

39. A stencil sheet comprising a base sheet having a coating comprising the following substances in substantially the proportions specified: 10 parts by weight, of 30 per cent solution of vinyl acetate in toluol, 2 parts aluminum stearate, 3½ parts peanut oil, 1 part dibutyl phthalate.

40. A stencil sheet comprising a base sheet having a coating thereon comprising a vinyl resin, shortening agent and dibutyl phthalate.

41. A stencil sheet comprising a base sheet having a coating thereon comprising a vinyl resin, and a wax.

Signed at Chicago, Illinois, this 12th day of December, 1928.

KENNETH W. CARR.